Dec. 8, 1970    G. B. ANDERSON    3,545,318

TOOL BLOCK

Filed July 25, 1968

INVENTOR
GEORGE B. ANDERSON

BY

ATTORNEY

United States Patent Office 3,545,318
Patented Dec. 8, 1970

3,545,318
TOOL BLOCK
George B. Anderson, Rochester, N.Y., assignor to Farrel Corporation, Rochester, N.Y., a corporation of Connecticut
Filed July 25, 1968, Ser. No. 747,693
Int. Cl. B23b 29/06
U.S. Cl. 82—36                    5 Claims

ABSTRACT OF THE DISCLOSURE

This tool block is formed with a tongue or projection that engages in a groove of the cross-slide, for instance, of a lathe, and is held releasably in place by a wedging bar, a clamping member, and bolts. The tool block has an inclined plane surface above the tongue or projection and inclined with reference to both the front side and the bottom of the groove. The wedging member has parallel top and bottom plane faces, and its bottom surface seats on the inclined plane surface of the block. When the bolts are tightened, the clamping member causes the wedging member to wedge the tool block against the front side of the groove. To remove the tool block, the bolts need only be loosened; the wedging member can then be slipped out; and the block lifted off the slide.

---

The present invention relates to tool holders, and more particularly to tool blocks for mounting tools on lathes and similar machine tools.

Heretofore it has been the practice to secure a tool block to a lathe by bolts passing through the tool block and threading into the cross-slide or other part of the lathe, or by clamps which engage over the tool block, or a part thereof, and which in turn are secured to the cross-slide or other part of the lathe. To remove the tool block from the lathe, where the block is secured directly by bolts, the bolts have to be completely unthreaded from the slide, or other part, to which they are secured. Where the block is secured in place by a clamp that is fastened in clamping position by bolts, the bolts still have to be unthreaded from the slide or other part of the lathe before the tool block can be removed. To fasten the new tool block in place requires rethreading of the bolts in position.

All of this takes time; and a valuable machine is standing idle while the tools are being changed.

The primary object of the present invention is to provide means for quickly and securely locking a tool block in place on a lathe, means which will permit quick removal of the tool block from the lathe and substitution of another tool block therefor.

Another object of the invention is to provide a tool block which will always locate a tool precisely on a machine so that the cutting edge of the tool will be precisely positioned as required for numerically-controlled machines.

Another object of the invention is to provide tool block clamping means for the purpose mentioned, which will be of extremely simple construction and be very easy to manipulate.

Other objects of the invention will be apparent hereinafter from the specification and from the recital of the appended claims particularly when read in conjunction with the accompanying drawing.

Figure 1:
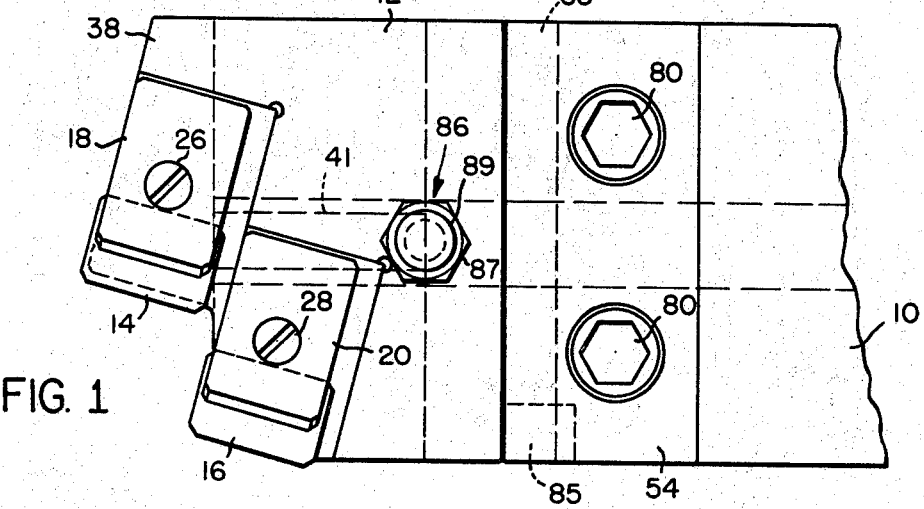
FIG. 1 is a plan view of a tool block made according to one embodiment of this invention, and of the means for fastening the block in position on a lathe.
Figure 2:
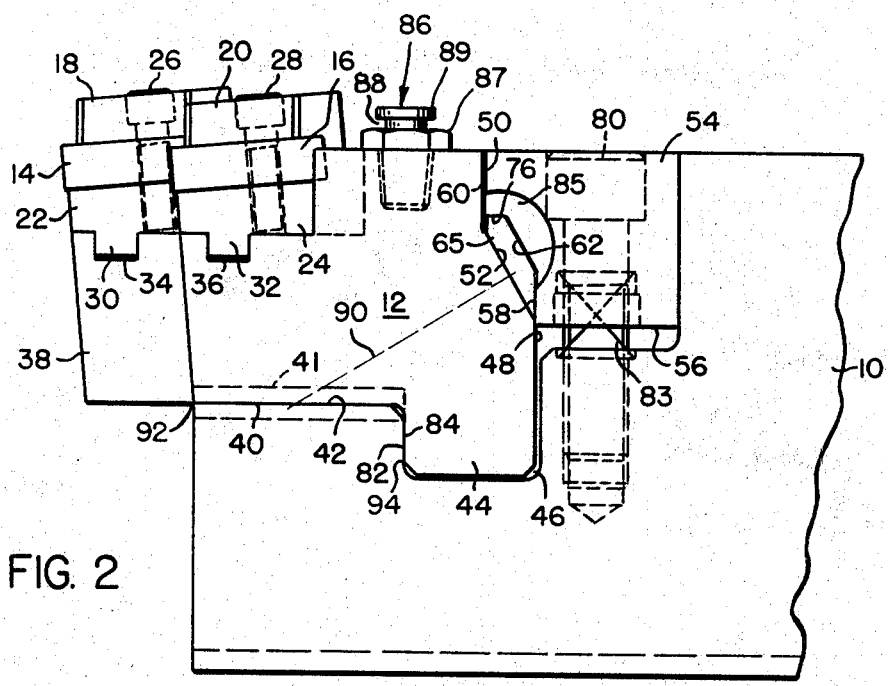
FIG. 2 is a side elevation of the parts shown in FIG. 1.
Figure 3:
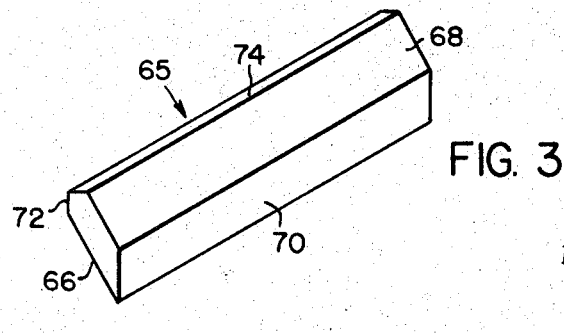
FIG. 3 is a perspective view of the wedging bar used for securing the tool block in position.

Referring now to the drawing by numerals of reference, 10 denotes the cross-slide or a tool shank supported on the carriage of a lathe, and 12 designates a tool block. In the instance shown, there are two tool bits 14 and 16 mounted on the block by conventional clamp plates 18 and 20, which engage over the tool bits 14 and 16 and are secured to plates 22 and 24, respectively, by screws 26 and 28, respectively. The plates 22 and 24, which have inclined upper plane faces, on which the tool bits 14 and 16, respectively, seat, are held against lateral movement relative to the tool block 12 by integral tongues 30, 32, respectively, which engage in grooves 34, 36, respectively, in the tool block.

The tool block shown has a protruding portion 38 on which the tool bit 14 is mounted.

All this is known construction and forms no part of the present invention.

The bottom surface 40 of the tool block 12 is generally plane and is adapted to seat on a plane surface 42 on the cross-slide 10. A key 41 engaging in registering grooves in the block and cross-slide locates the block laterally on the cross-slide. The block has a tongue or rib 44 at its bottom rear which engages in a slot or groove 46 in the slide 10. The projection 44 has a plane rear face 48 for the lower portion of its height, and another plane surface 50 for the upper portion of its height, which is offset laterally from the plane surface 48 and which is connected to the plane surface 48 by an inclined plane surface 52.

For securing the tool block to the slide or carriage 10, a clamping member 54 is employed. This clamping member has a plane bottom surface 56, a front face whose lower portion 58 is vertical and plane, whose upper portion 60 is vertical and plane, and which has a plane inclined surface portion 62 connecting the portions 58 and 60 and inclined to the surfaces 58, 60 at the same angle as the surface 52 is inclined to the surfaces 48 and 50.

The clamping member 54 is adapted to clamp the tool block 12 in position by means of a wedging bar 65. This bar has a plane surface 66 at its bottom, a parallel plane surface 68 at its top, an inclined surface 70 connecting the surfaces 66 and 68 at one side of the bar, and a right-angular end face consisting of surfaces 72 and 74 connecting the surfaces 66 and 68 at the other side of the bar.

When the bar 65 is in position, its surface 66 rests on the inclined surface 52 of the tool block, its surface 70 is contiguous to the surface 58 of the clamping member 54, its surface 68 is in engagement with the surface 62 of the clamping member, its surface 74 is in engagement with the surface 76 of the clamping member, and its surface 72 is adjacent the surface 50 of the tool block.

The clamping member 54 is adapted to be moved to and from and secured in, clamping position by bolts 80 which pass through holes in the clamping member and thread into the slide 10.

When the bar 65 is in position, and the bolts 80 are tightened up, the shoulder 76 of the clamping member forces the bar 65 downwardly to wedge the bottom surface 40 of the block on its seat 42, and to wedge the side 82 of the projection 44 of the block against the side wall 84 of the groove 46. In the wedging operation the side 70 of the bar slides downwardly on the side 58 of the clamping member; and force is applied to the block 12 in an inclined direction, indicated by line 90, between points 92 and 94.

Tool holders constructed according to the present invention are very valuable for use in machines operating on computerized programs. The positions of tools on tool blocks can be adjusted precisely on the bench so that their cutting edges have a predetermined precise position. When a tool block with a tool so positioned is put on a lathe or other machine tool, then, and the tool block is wedged down into place, the cutting edge of the tool will be precisely positioned on the machine. Through key 41 the tool block is accurately held laterally, and through action of bolts 80 and wedging member 65, the tool block is seated precisely against the front wall of the groove 46 and on seat 42.

A notch 85 is milled in the clamping member 54 to permit easy access to the bar 65.

By unthreading the bolts 80 just the least bit, the bar 65 will be released, and can be slid out from between the clamping member 54 and the block 12. This permits the block to be lifted off of the slide or carriage 10 without removing the clamping member 54 or the bolts 80. A new tool block can then be inserted in place, and the bolts 80 retightened, to secure the new tool block in place. Thus, with less than one turn of the bolts 80, a tool block can be released, and a new tool block can be fastened securely to the lathe.

To aid in quick release of the bolts, each may be mounted midlength in slide 10 in a spring-type ball seal 83 of known construction that forms no part of the present invention.

Since the tools heat up during cutting and their heat is transmitted to the tool block, it is desirable to provide some means for lifting the tool block off the lathe, after the securing bolts have been loosened and the wedging member removed. For this purpose, I have provided a stud 86 which has a hexagonally-shaped collar 87 intermediate its ends and which is threaded into the block and which is recessed at 88 beneath head 89 so that it can be engaged by a fork-shaped tool to lift the tool block up and off the machine after the tool block is released. The lifting tool may be provided with a wrench portion which engages hex collar 87 while the fork portion of the tool engages under head 89 in groove 88. The wrench portion can be used also to manipulate bolts 80.

While the invention has been described in connection with one embodiment thereof, and a particular use therefor, however, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a machine tool,
the combination with a support which has a groove therein which has parallel plane sides, and an upper plane seating surface forwardly of said groove, of
a tool block for holding a tool removably mounted on said support and having a downwardly-extending projection thereon engageable in said groove,
said projection being narrower than said groove and having parallel plane sides parallel to the sides of said groove,
said tool block having a surface above said projection inclined to the planes of said seating surface and of said sides,
a clamping member movably mounted on said block and having a protrusion overlying said inclined surface,
a member disposed between said protrusion and said inclined surface, and
a bolt extending through said clamping member and into said tool block to apply pressure through said movable member to said inclined surface in a direction inclined to said sides and to said plane seating surface to wedge said projection against one side of said groove and to force said block down on said seating surface,
said member being movable, upon release of said clamping member, to permit removal of said tool block from said support without removal of said clamping member and bolt therefrom.

2. In a machine tool, the combination with a support which has a groove therein and a plane seating surface forwardly of said groove,
of a tool block removably mounted on said support and having a plane bottom face for a portion of its length adapted to seat on said seating surface, and having a projection thereon engageable an said groove,
said projection having a plane front side surface,
said groove being slightly wider than said projection and having a plane front side surface against which said plane front side surface of said projection seats,
said tool block having a plane surface above said projection inclined with reference to the planes of said seating surface and said front side surfaces,
a clamping member having a protrusion overlying said inclined plane surface, and
a wedging bar removably interposable between said inclined plane surface and said protrusion, and
means for moving said clamping member in a direction parallel to said front side surfaces for securing said clamping member under pressure to said support.

3. In a machine tool, the combination with a support which has a groove therein and a plane seating surface forwardly of said groove,
of a tool block removably mounted on said support and having a plane bottom face for a portion of its length adapted to seat on said seating surface, and having a projection thereon engageable in said groove,
said projection having a plane front siue,
said groove being slightly wider than said projection and having a plane front side surface,
said tool block having a plane surface above said projection inclined with reference to the planes of said seating surface and said front side surfaces,
a clamping member having a protrusion overlying said inclined plane surface, and
a wedging bar removably interposable between said inclined plane surface and said protrusion, and
means for securing said clamping member under pressure to said support,
said wedging bar having parallel plane upper and lower surfaces, its lower surface seating on said inclined plane surface and its upper surface being engaged by a plane surface on said clamipng member which is parallel to said inclined plane surface, and
said securing means being a bolt that threads into said support and extends in a direction perpendicular to said plane seating surface of said support.

4. In a machine tool, the combination with a support which has a groove therein and a plane seating surface forwardly of said groove,
of a tool block removably mounted on said support and having a plane bottom face for a portion of its length adapted to seat on said seating surface, and having a projection thereon engageable in said groove,
said projection having a plane front side,
said groove being slightly wider than said projection and having a plane front side surface,
said tool block having a plane surface above said projection inclined with reference to the planes of said seating surface and said front side surfaces,
a clamping member having a protrusion overlying said inclined plane surface, and a wedging bar removably interposable between said inclined plane surface and said protrusion, and means for securing said clamping member under pressure to said support, said wedging bar having parallel upper and lower plane surfaces, a V-shaped side surface at one side and a plane surface at the opposite side connecting said upper and lower plane surfaces and joining said lower plane surface of said bar at an acute angle and joining said upper plane surface of said bar at an obtuse angle, and one leg of said V-shaped side being parallel to said opposite side surface, and the other leg of said V-shaped side being perpendicular to the first-named leg, said protrusion having an underface shaped to fit and seat against the other leg of said V-shaped side, and the upper plane surface of said bar, and a bolt is releasably threaded into said support in a direction parallel to said one plane side of said groove, releasably to secure said clamping member, wedging bar and tool block to said support.

5. In a machine tool, the combination claimed in claim 3, wherein a key, which extends longitudinally of said tool block, interconnects said tool block and said support to precisely locate said tool block laterally on said support, and said front side surface of said groove is vertical and said seating surface is horizontal and these two surfaces are at right angles to one another so that when said bolt is tightened said wedging member forces said tool block securely against said front side surface and onto said seating surface, whereby a tool carried by said tool block is precisely positioned in horizontal and vertical directions, and said tool is readily removable from the machine by loosening said bolt and then removing said wedging member.

References Cited
UNITED STATES PATENTS

| | | | |
|---|---|---|---|
| 810,307 | 1/1906 | Robinson | 29—96 |
| 1,443,752 | 1/1923 | Lindmark | 29—96 |
| 2,571,530 | 10/1951 | Brekke | 82—36 |
| 3,207,015 | 9/1965 | Ditto | 82—36 |

LEONIDAS VLACHOS, Primary Examiner

U.S. Cl. X.R.

29—96